UNITED STATES PATENT OFFICE.

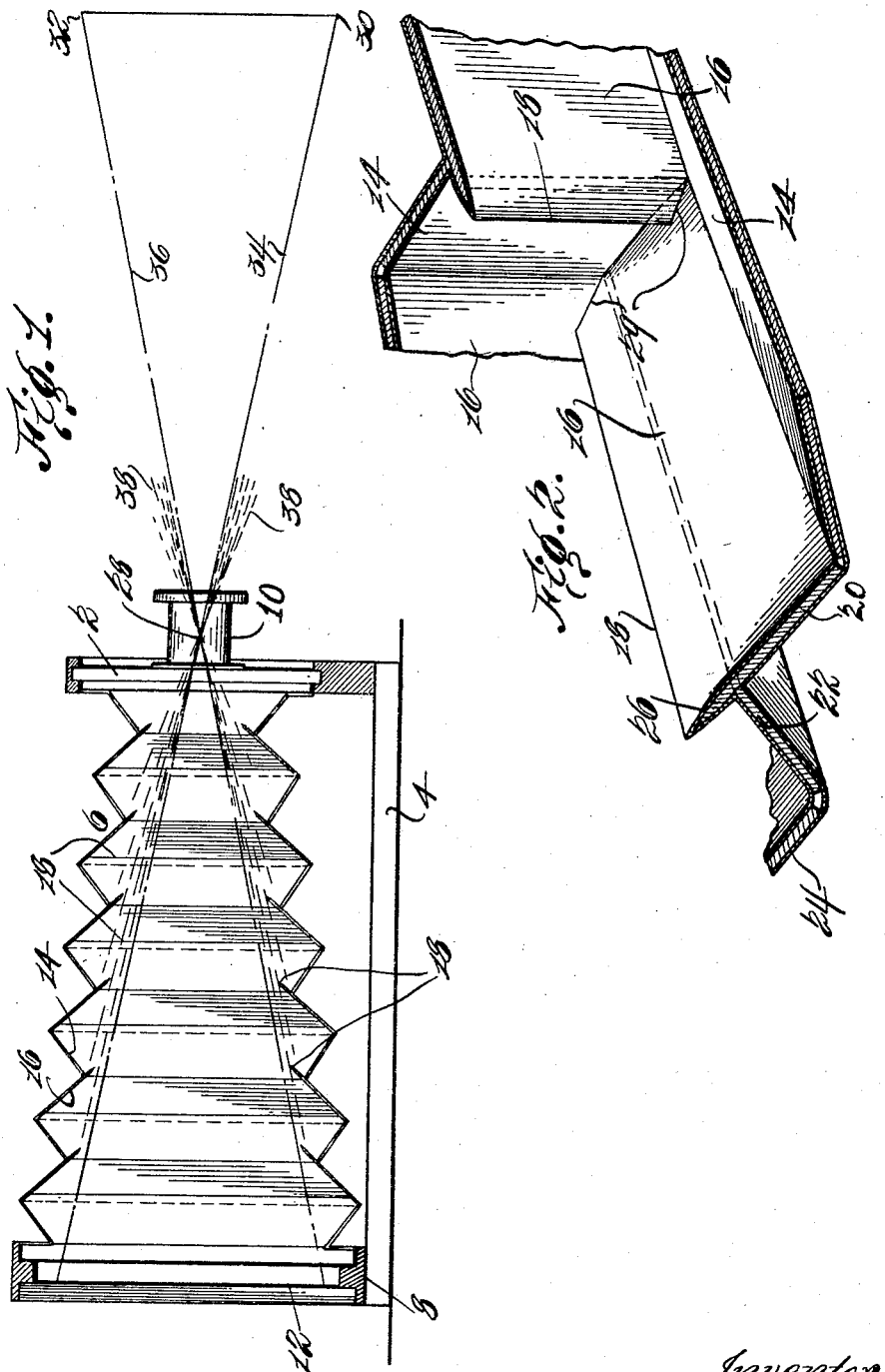

LAWRENCE X. CHAMPEAU, OF ORANGE, NEW JERSEY.

CAMERA.

1,291,405.　　　　Specification of Letters Patent.　　Patented Jan. 14, 1919.

Application filed May 18, 1915.　Serial No. 28,844.

*To all whom it may concern:*

Be it known that I, LAWRENCE X. CHAMPEAU, a citizen of the United States, residing at No. 7 Ivy Court, Orange, Essex county, New Jersey, have invented certain new and useful Improvements in Cameras, of which the following is a clear, full, and exact description.

This invention relates to optical structures and is herein shown as embodied in a photographic camera. It will be understood, however, that the invention is not restricted to its illustrated embodiment or use, but is of general applicability and utility in the art to which it relates.

The invention relates particularly to optical instruments which embody image-forming means, and a general object of the invention is to prevent the interference of stray or non-image-forming light with the proper definition or relative illumination of the image formed by said image-forming means.

To prevent stray or non-image-forming light from reaching the point at which the image formed by the image-forming means is located, or from reaching the surface upon which the image is received, it is customary to cover the inside of the light excluding casing of the instrument or other structure with some good light-absorbing coloring material such as bone-black, and when there is a great deal of diffused light within the field of the instrument to "stop down" or reduce the size of the light-receiving opening adjacent to the image-forming means, thereby increasing the definition of the image at the expense of its illumination. Even the best light-absorbing material will not prevent the reflection from the sides of the casing of some of the non-image-forming light which enters the light-receiving opening, and in photographic cameras, particularly, if this light is reflected upon the image-receiving surface, it affects materially the quality of the work produced by the camera by reducing the clearness and sharpness of definition of the image, or even "fogging" the picture, as it is sometimes called.

A particular object of the invention is to provide means for intercepting the non-image-forming light and preventing it from reaching the image-receiving surface or the point at which the image is formed. This means may be arranged either to intercept the light before it strikes the surface from which it would be reflected to the image-receiving surface, or to intercept the light after it has been reflected, or it may be arranged to perform both of the aforementioned functions. Preferably the means will be so arranged that it forms with the side of the instrument casing a light-receiving pocket.

An important feature of the invention is its novel illustrated embodiment in a camera of the bellows type wherein the light-intercepting means is formed by extending upon the inside of the camera those parts of the bellows folds which present their inclined surfaces away from the light-receiving opening of the camera.

Other objects and important features of the invention will appear from the following description and claims when considered in connection with the accompanying drawings, in which—

Figure 1 is a vertical longitudinal section through a camera of the bellows type, having incorporated therein the present invention; and Fig. 2 is a perspective detail showing the manner of forming the light baffles by extending one of the fold members over the other.

Although the invention is herein shown as incorporated in a camera, it will be understood that it is equally applicable to other optical structures, the invention being shown in its application to a camera, since that is one of its widest fields of usefulness.

The camera herein shown comprises a front 2 slidable upon a base 4, and connected by a bellows 6 with the back 8. The bellows 6 herein shown is of the type in which the hills of the top and bottom folds coincide with the valleys of the side folds. Carried upon the front 2 is any suitable image-forming means having suitable shutters and stops, this structure not being illustrated in detail but being represented as a whole at 10. The image-receiving surface of the camera is shown at 12, and may be constituted either by a sensitized plate or a ground glass screen, or by any other suitable surface on which the image may be formed.

From an inspection of Fig. 1 of the drawings, it will be seen that the folds of the bellows, when the camera is extended into operative condition, have upon the inside of the camera inclined surfaces 14 presented toward the light-receiving opening or image-forming means of the camera, and other inclined surfaces 16 presented away from the light-receiving opening. In the ordinary bellows camera, where these two surfaces meet to form the hills of the bellows folds upon the inside of the camera, they are likely to become rounded and worn, and thus present reflecting surfaces from which light other than the image-forming light which enters the light-receiving opening may be reflected to the image-receiving surface 12. Moreover, the inclined surfaces 14 upon which such light may fall, are frequently also in a position or in a condition to reflect some of this light to the image-receiving surface.

To overcome the aforementioned defects in the ordinary bellows camera and in cameras and optical structures in general, the invention aims to provide means for intercepting the non-image forming light either before it reaches the surface from which it might be reflected to the image-receiving surface or after it has been reflected, and thus prevent its reaching the image-receiving surface. In the illustrated embodiment of the invention, means is provided which performs both of the aforementioned functions, the illustrated means comprising baffles 18 which are formed as extensions of the fold members 20 of the bellows and project over the surfaces 14, thus both preventing the reflection of light from these surfaces to the surface 12 and also intercepting some of the light which would fall upon the surfaces 14 behind said baffles.

In Fig. 2 is shown in detail a preferred construction of a bellows having embodied therein these light baffles, this bellows being formed of fold members 20 and 22 covered upon the outside by any suitable flexible covering material 24, such as leather, and covered upon the inside by thin canvas or other suitable lining material 26, the fold members 20 as shown, being extended to project over the fold members 22 and being sharpened upon their projecting edges, and the lining material 26 being carried over both faces and over the sharpened edges of the projecting portions of said members 20 as well as over the inclines 16.

It is important that the exposed edges of the baffles 18 be as thin as possible consistent with strength and durability, in order that these edges themselves may not provide reflecting surfaces from which non-image forming light might be reflected to the image-receiving surface 12. Although I have shown the lining material as extending over the sharpened edges of these baffles, it will be understood that this is not essential and in some cases may be even undesirable, for example, when the lining material is so thick that it would tend to form blunt exposed edges upon the baffles.

In Fig. 2 is also illustrated in detail the relative arrangement of the horizontal and vertical baffles, the vertical hills of the bellows folds alternating with the horizontal hills. To provide for the extension of the camera, it will be noted that each of these baffles at its ends is beveled off at 29 where it would project into the adjacent hill of the adjacent side of the camera were its side edge extended straight to its projecting edge. The illustrated bevels are formed at angles of substantially 45° to the projecting edge, such a bevel being found to take care of the ordinary range of extensions of the bellows.

Although the invention is illustrated in connection with a bellows camera in which, as above pointed out, the hills of the top and bottom coincide with the valleys of the side, it will be apparent that it is equally as applicable to bellows of the type in which the hills at the top and bottom coincide with the hills at the sides. In such a camera, the projecting edges of each set of baffles would be all in one plane.

In Fig. 1 of the drawings is shown diagrammatically, the manner of operation of the invention. The optical center of the image-forming means may be represented as being at 28, and an image to be photographed may be represented by the vertical line 30, 32. Rays of light 34, 36, extending from the ends of the line 30, 32, through the optical center 28 to the image-receiving surface 12, determine by their intersection with said surface the upper and lower boundaries of the image formed upon said surface. At 38 are shown rays of non-image-forming light coming from points outside of the object and passing through the image-forming means and striking upon the inner surfaces of the camera. It will be seen that as these rays strike the inclined surfaces 14 which are presented toward the light-receiving opening of the camera, they are prevented from being reflected from those surfaces to the surface 12 by the projecting baffles 18. It will be seen further that these baffles 18 also prevent some of these rays from reaching the surfaces 14 which lie behind the baffles. Thus the baffles 18 perform two functions, namely, they prevent the reflection to the receiving surface 12 of non-image-forming rays of light incident upon the inner surfaces of the camera, and particularly upon the inclined surfaces 14, at angles within the range of reflecting angles to the surface 12, and moreover they also prevent the incidence of some of these rays upon the said surfaces at angles within the range of reflecting angles.

It will be noted that the baffles 18 are so inclined to the optical axis of the camera when the camera is in operative condition that any rays of light incident upon their surfaces will be reflected to the sides of the camera either in such direction that they are reflected from said sides back toward the light-receiving opening, or that they will be confined in the pockets formed between the baffles and the sides of the camera. These pockets thus constitute light-receiving pockets. It will be obvious, however, that it is not necessary that the baffles be inclined to the optical axis of the camera so long as they operate to intercept the rays of light, although in the bellows type of camera the inclined arrangement of the baffles is the preferred construction.

It will be apparent that the invention is susceptible of embodiment in a great variety of structures and in a great variety of forms, and that the embodiment herein shown is only illustrative.

What I claim as new is:—

1. In a camera, a front provided with a light-receiving opening, a bellows extending rearwardly from said front and a series of light baffles upon the inside of said bellows projecting over parts of the bellows folds which present their inclined surfaces toward the light.

2. In an optical structure, image-forming means, means for receiving the image, a light excluding casing extending between said two means, and a series of light baffles projecting inwardly from the sides of said casing but outside the field of the image-forming light, the inner edges of said baffles overhanging in the direction of said image-forming means.

3. In an optical structure, image-forming means, means for receiving the image, a light excluding casing extending between said two means, and a series of light baffles projecting inwardly and forwardly from the sides of said casing but outside the field of the image-forming light casing.

4. In an optical structure, image-forming means, means for receiving the image, a light excluding casing extending between said two means, and light baffles so inclined to the optical axis of said structure that the light incident upon their exposed surfaces is reflected directly to the adjacent sides of said casing and behind said baffles with respect to said optical axis.

5. In an optical structure, image-forming means, means for receiving the image, a light excluding casing comprising a bellows extending between said two means, and a series of light baffles projecting inwardly from the sides of said bellows, the baffles on one side alternating with and projecting over those of the adjacent sides.

6. In an optical structure, image-forming means, means for receiving the image, a light excluding casing extending between said two means, a series of light baffles projecting inwardly from the sides of said casing, the baffles on one side alternating with and projecting over those of the adjacent sides.

7. In an optical structure, image-forming means, an image-receiving surface, a light excluding casing extending between said means and said surface, and means for preventing non-image-forming light from reaching said receiving surface, comprising baffles projecting from the sides of said casing and so inclined to the optical axis of said structure that they form light receiving pockets in which the incident non-image-forming light is reflected directly to the side of said casing behind said baffles with respect to said optical axis.

8. In a camera, a front provided with a light-receiving opening, and a bellows extending rearwardly from said front, parts of the folds of said bellows which present their inclined surfaces away from the light received through said opening being extended to form a series of light-intercepting projections over parts of the folds which present their inclined surfaces toward the light.

9. In a camera, a front provided with a light-receiving opening, a bellows extending rearwardly from said front, parts of the folds of said bellows which present their inclined surfaces away from the light received through said opening being extended to form a series of light-intercepting projections over parts of the folds which present their inclined surfaces toward the light, and a continuous lining extending over the inclined surfaces of said bellows folds and over the end and both faces of each of said extensions.

10. In a camera, a front provided with a light receiving opening, a bellows extending rearwardly from said front, and a series of light baffles upon the inside of said bellows, said baffles forming rigid inwardly projecting extensions of parts of the bellows folds whereby they are presented in definite angular relations to the optical axis of the camera as the bellows is extended and contracted.

11. In a camera, image-forming means, means for receiving the image, an extensible and contractible light excluding casing connecting said means, and a series of light baffles projecting inwardly from the sides of said casing and movable into variable relations of separation as said casing is extended and contracted.

12. In a camera, image-forming means, means for receiving the image, an extensible and contractible light excluding casing connecting said means, a series of parallel light baffles projecting inwardly from a side of said casing, said baffles being so connected to said casing that they move into varying relations of separation as said casing is extended, without disturbance of their parallel relationship.

13. In a camera, image-forming means, means for receiving the image, an extensible and contractible light excluding casing connecting said means, and a series of substantially uniformly spaced light baffles projecting inwardly from the sides of said casing, said baffles being so connected to the sides of said casing that the extent of uniform spacing is varied as the casing is extended and contracted.

14. In a camera, image-forming means, means for receiving the image, an extensible and contractible light excluding casing connecting said means, and a series of light baffles projecting inwardly from all sides of said casing toward the optical axis of the camera and movable into varying relations of separation as said casing is extended and contracted.

15. In a camera, image-forming means, means for receiving the image, a light excluding casing extending between said means, and a series of light baffles projecting inwardly toward the optical axis from all sides of said casing, the inner edges of said baffles overhanging in the direction of said image-forming means.

16. In a camera, image-forming means, means for receiving the image, a light excluding casing extending between said means, and a series of light baffles projecting inwardly toward the optical axis from the sides of said casing but outside the field of the image-forming light, the inner edges of said baffles being sharpened and overhanging in the direction of said image-forming means.

17. In an optical structure, image-forming means, means for receiving the image, a light excluding casing extending between said two means and comprising a bellows having the hills of one side alternating with the hills of the adjacent sides, and a series of light baffles projecting inwardly from the sides of said bellows, said baffles upon each side projecting into the valleys of the adjacent sides.

Signed at New York city, N. Y., this 14th day of May, 1915.

LAWRENCE X. CHAMPEAU.

Witnesses:
BEATRICE MIRVIS,
CHAS. CLARK.

Copies of this patent may be obtained for five cents each, by addressing the "Commissioner of Patents, Washington, D. C."

Correction in Letters Patent No. 1,291,405.

It is hereby certified that in Letters Patent No. 1,291,405, granted January 14, 1919, upon the application of Lawrence X. Champeau, of Orange, New Jersey, for an improvement in "Cameras," an error appears in the printed specification requiring correction as follows: Page 3, line 45, claim 3, strike out the word "casing"; and that the said Letters Patent should be read with this correction therein that the same may conform to the record of the case in the Patent Office.

Signed and sealed this 22d day of April, A. D., 1919.

[SEAL.]

F. W. H. CLAY,

*Acting Commissioner of Patents.*

Cl. 95—39.